US006967066B2

(12) United States Patent
Kameyama et al.

(10) Patent No.: US 6,967,066 B2
(45) Date of Patent: Nov. 22, 2005

(54) NON-AQUEOUS ELECTROLYTE SECONDARY BATTERY

(75) Inventors: Fumito Kameyama, Fukushima (JP); Fumiko Hara, Fukushima (JP); Tsuyoshi Sugiyama, Miyagi (JP); Michiko Komiyama, Fukushima (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 09/825,988

(22) Filed: Apr. 4, 2001

(65) Prior Publication Data

US 2002/0031703 A1 Mar. 14, 2002

(30) Foreign Application Priority Data

| | | |
|---|---|---|
| Apr. 4, 2000 | (JP) | P2000-102624 |
| Apr. 10, 2000 | (JP) | P2000-108412 |
| Apr. 12, 2000 | (JP) | P2000-111044 |

(51) Int. Cl.[7] .......... H01M 6/12

(52) U.S. Cl. .......... 429/162; 429/163; 429/233; 429/224; 429/231.1; 429/231.3; 429/316; 429/317; 429/324

(58) Field of Search .......... 429/162, 163, 429/223, 224, 231.1, 231.3, 316, 317, 324

(56) References Cited

U.S. PATENT DOCUMENTS

| | | | | |
|---|---|---|---|---|
| 5,976,731 A | * 11/1999 | Negoro et al. | .......... | 429/328 |
| 2003/0087161 A1 | * 5/2003 | Topsoe | .......... | 429/330 |

FOREIGN PATENT DOCUMENTS

| | | |
|---|---|---|
| EP | 0 895 296 A1 | 2/1999 |
| FR | 2 761 531 A1 | 3/1998 |
| JP | 11283668 | 10/1999 |
| WO | WO 98/26469 | 6/1998 |
| WO | WO 99/34471 | 7/1999 |

OTHER PUBLICATIONS

Database WPI—Section CH, Week 199938, Derwent Publications Ltd., London , GB;, An 1999–449698, XP002287077 & JP 11 185811A (Tonen Corp), published Jul. 9, 1999, abstract.

Europeam Search Report filed Aug. 23, 2004.

* cited by examiner

*Primary Examiner*—Laura Weiner
(74) *Attorney, Agent, or Firm*—Sonnenschein, Nath & Rosenthal LLP

(57) ABSTRACT

A non-aqueous electrolyte secondary battery has a positive electrode having a positive electrode collector, on which a positive electrode active material layer containing a positive electrode active material as a complex oxide of Li and transition metals are formed, and a negative electrode having a negative collector, on which a negative electrode active material layer is formed. The non-aqueous electrolyte secondary battery is a gel or solid non-aqueous electrolyte secondary battery having a battery device in which a positive electrode and a negative electrode are laminated with an electrolyte layer therebetween in a film-state packaging member constructed by metal foil laminated films, and containing a lithium salt, a non-aqueous solvent, and a polymer material. The concentration in mass ratio of a free acid in the electrolyte layer is 60 ppm and less. Average particle diameter of the positive electrode active material lies in a range from 10 to 22 $\mu$m, the minimum particle diameter is 5 $\mu$m or larger, the maximum particle diameter is 50 $\mu$m or smaller, and specific surface of the positive electrode active material is 0.25 $m^2/g$ or smaller. Lithium carbonate ($Li_2CO_3$) contained in the positive electrode active material is 0.15 percent by weight and less. Moisture contained in the positive electrode active material is 300 ppm and less.

6 Claims, 6 Drawing Sheets

NON-AQUEOUS ELECTROLYTE SECONDARY BATTERY

RELATED APPLICATION DATA

The present application claims priority to Japanese Applications Nos. P2000-102624 filed Apr. 4, 2000, P2000-108412 filed Apr. 10, 2000, and P2000-111044 filed Apr. 12, 2000, which applications are incorporated herein by reference to the extent permitted by law.

BACKGROUND OF THE INVENTION

The present invention relates to a battery in which a battery device having electrolyte as well as a positive electrode and a negative electrode is sealed in a film-state packaging member.

In recent years, a secondary battery used as a power source of a portable electronic device has been actively studied and developed. Among the secondary batteries, attention is paid on a lithium secondary battery and a lithium ion secondary battery as secondary batteries capable of realizing high energy density. Conventionally, each of each secondary batteries is generally constructed by interposing a liquid electrolyte (hereinbelow, also called electrolyte solution) obtained by dissolving a lithium salt into a non-aqueous solvent between a positive electrode and a negative electrode and accommodating them in a housing made of a metal.

When a hard case cell made of a metal is used, a problem such that strong recent demands of a lighter, smaller, and thinner secondary battery are not sufficiently addressed occurs. As electronic devices are becoming smaller and smaller, a secondary battery is also demanded to have an increased degree of freedom in shape. When a metal hard case cell is used, the demand regarding shape cannot be also sufficiently addressed.

In order to prevent leakage of the electrolyte solution, it is necessary to use a metal hard case cell (a positive electrode cover and a negative electrode can) having rigidity. As described above, when the non-aqueous solution is used, a problem such as leakage occurs. It is therefore proposed to use, in place of the electrolyte solution, a gel electrolyte obtained by making a non-aqueous electrolyte solution containing a lithium salt held by a polymer compound, a solid electrolyte obtained by dispersing or mixing a lithium salt into a polymer compound having ion conductivity, or an electrolyte in which a lithium salt is held by a solid inorganic conductor. This non-aqueous gel polymer secondary battery has a positive electrode having a positive electrode collector on which a positive electrode active material layer is formed, and a negative electrode having a negative electrode collector on which a negative electrode active material is formed and has a structure that a gel layer containing an electrolyte is sandwiched between the positive electrode active material layer of the positive electrode and the negative electrode active layer of the negative electrode.

In the gel layer containing the electrolyte in such a non-aqueous gel polymer secondary battery, an electrolyte solution is held in a gel matrix. By using the gel or solid electrolyte, the problem of leakage of the electrolyte solution is solved. The hard case cell becomes unnecessary. The degree of freedom in shape can be increased by using a film more flexible than a metal housing or the like as a packaging member. Further reduction in size, weight, and thickness can be realized.

In the case of using a film-state case such as a laminated film, a polymer film, or a metal film obtained by covering metal foil made of aluminum or the like with a resin as a packaging member, however, when lithium hexafluorophosphate ($LiPF_6$), lithium tetrafluoroboric acid ($LiBF_4$), or the like is used as a lithium salt, a problem such as a battery expansion occurs. One of the factors of this phenomenon may be considered that, even if a very small amount of moisture exists in a battery system, a lithium salt is descomposed and a free acid component such as hydrogen fluoride (HF) or ion fluoride is generated. When the free acid component reacts with the lithium to form lithium fluoride (LiF) or the like and the lithium in the battery system is consumed, problems such that shelf stability or charge/discharge cycle characteristic deteriorates and a theoretical battery capacity cannot be obtained, occur.

In a conventional secondary battery using non-aqueous gel electrolyte or solid electrolyte, lithium-cobalt complex oxide is used as a positive electrode active material. A secondary battery using a non-aqueous gel electrolyte or solid electrolyte housed in a metal foil laminate case has a significant challenge to suppress expansion which is seen in a high temperature storage test or the like since a housing for accommodating the aluminum laminate pack may be broken due to the expansion.

In a conventional non-aqueous lithium ion secondary battery, the positive electrode active material contains from 0.8% to 1.2% of lithium carbonate ($Li_2CO_3$) so as to provide the function of generating $CO_2$ gas to shut down a safety valve in the case where the temperature of the battery becomes high when heated or excessively charged. A conventionally used positive electrode active material includes about 500 ppm of water content by which a gas is generated when the battery is heated or excessively charged.

On the other hand, a non-aqueous gel polymer secondary battery has improved safety against heating and excessive charging, and it is unnecessary to generate a gas when the temperature becomes high. The conventional non-aqueous gel polymer secondary battery uses lithium-cobalt complex oxide as a positive electrode active material. A non-aqueous gel polymer secondary battery using a metal foil laminate pack obtained by covering metal foil such as aluminum foil with a resin has a significant challenge to suppress expansion, which is seen in a high temperature storage test or the like since there is the possibility that an aluminum laminate pack is not housed in a set case due to the expansion.

SUMMARY OF THE INVENTION

The invention has been achieved in consideration of the problems and its object is to provide a battery capable of suppressing shape change and suppressing deterioration in battery characteristics.

Another object of the invention is to provide a positive electrode active material capable of suppressing expansion of a battery and a non-aqueous electrolyte secondary battery using the positive electrode active material.

According to first aspect of the invention, a non-aqueous electrolyte secondary battery includes a battery device having a positive electrode having a collector, on which a positive electrode active material layer containing a positive electrode material is formed, a negative electrode, and an electrolyte layer, the battery device being sealed in a film-state packaging member, and concentration in mass ratio of a free acid in the electrolyte layer is 60 ppm and less. In the battery, more preferably, the positive electrode active material is a composite oxide $LiCoO_2$.

As the packaging member, preferably, a metal foil laminate case or laminated film obtained by coating metal foil with a resin and having the structure of packaging resin layer/metal layer/sealant layer is used.

According to the second aspect of the invention, a non-aqueous electrolyte secondary battery comprises a positive electrode having a positive electrode collector on which a positive electrode active material layer containing a positive electrode material is formed, a negative electrode having a negative electrode collector on which a negative electrode active material layer is formed, and a film-state case as a packaging member. In the battery, average particle diameter of the positive electrode active material lies in a range from 10 to 22 $\mu$m.

More preferably, the positive electrode active material has minimum particle diameter of 5 $\mu$m or larger, maximum particle diameter of 50 $\mu$m and less, and specific surface area of 0.25 $m^2/g$ and less. Preferably, the positive electrode active material is $LiCoO_2$.

According to a third aspect of the invention, a non-aqueous electrolyte secondary battery comprises a positive electrode having a positive electrode collector, on which a positive electrode active material layer containing a positive electrode material is formed, a negative electrode having a negative electrode collector on which a negative electrode active material layer is formed, and a film-state case as a packaging member. In the battery, the positive electrode active material layer contains 0.15 percent by weight of carbonate compound. Preferably, moisture contained in the positive electrode active material is 300 ppm and less. Preferably, the positive electrode active material layer is made of a lithium and a transition metal complex oxide $LiMO_2$ (where, M is at least one material selected from Co, Ni, and Mn. More preferably, the positive electrode active material layer is made of $LiCoO_2$, and the carbonate contained in the positive electrode active material is $LiCoO_3$.

In the non-aqueous electrolyte secondary battery according to the first aspect of the invention, since the concentration in mass ratio of a free acid in the electrolyte is 60 ppm and less, even when the film-state packaging member is used, a change in shape is suppressed, and deterioration in battery characteristics is suppressed.

In the non-aqueous electrolyte secondary battery according to the second aspect of the invention, since the average particle diameter of the positive electrode active material lines in a range from 10 to 22 $\mu$m, the specific surface area of the positive electrode active material becomes narrow, a reaction area decreases and, as a result, generation of gas when the battery is stored at high temperature, is suppressed.

In the non-aqueous electrolyte secondary battery according to the third aspect of the invention, since the carbonate contained in the positive electrode active material is 0.15 percent by weight and less, decomposing reaction when the battery is stored at high temperature is suppressed, and generation of gas is suppressed.

Other and further objects, features and advantages of the invention will appear more fully from the following description.

DETAILED DESCRIPTION OF THE PREFERRED EMBODIMENTS

Embodiments of the invention will be described in detail hereinbelow with reference to the drawings.

Figure 1:
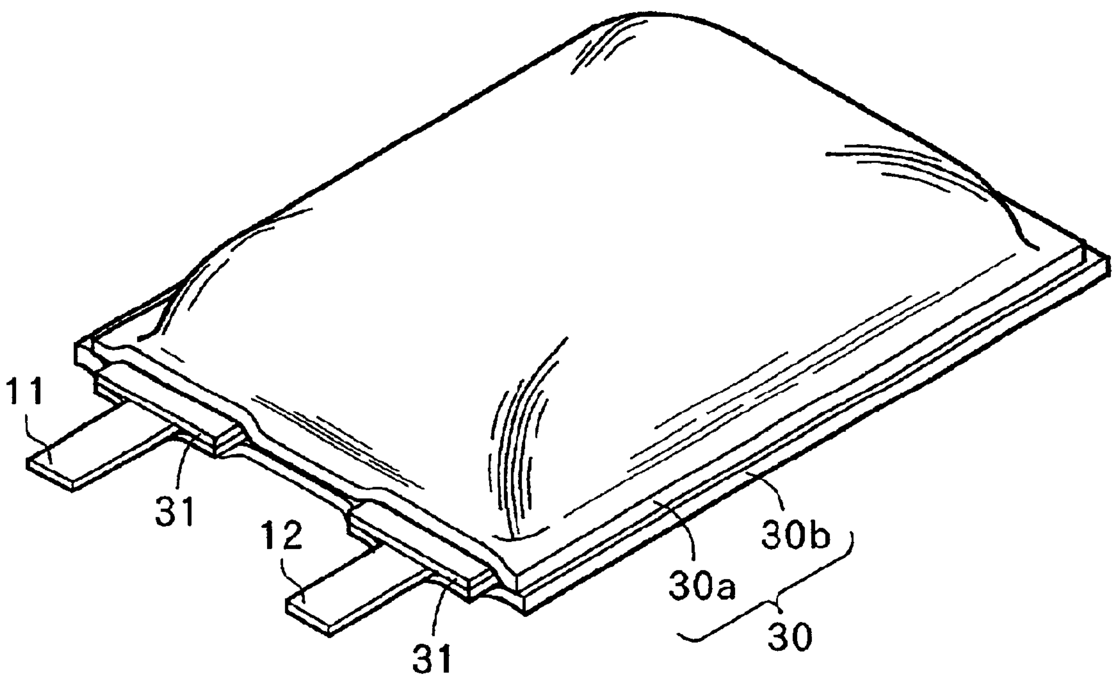
FIG. 1 is a perspective view showing the configuration of a secondary battery according to the first aspect of the invention.
Figure 2:
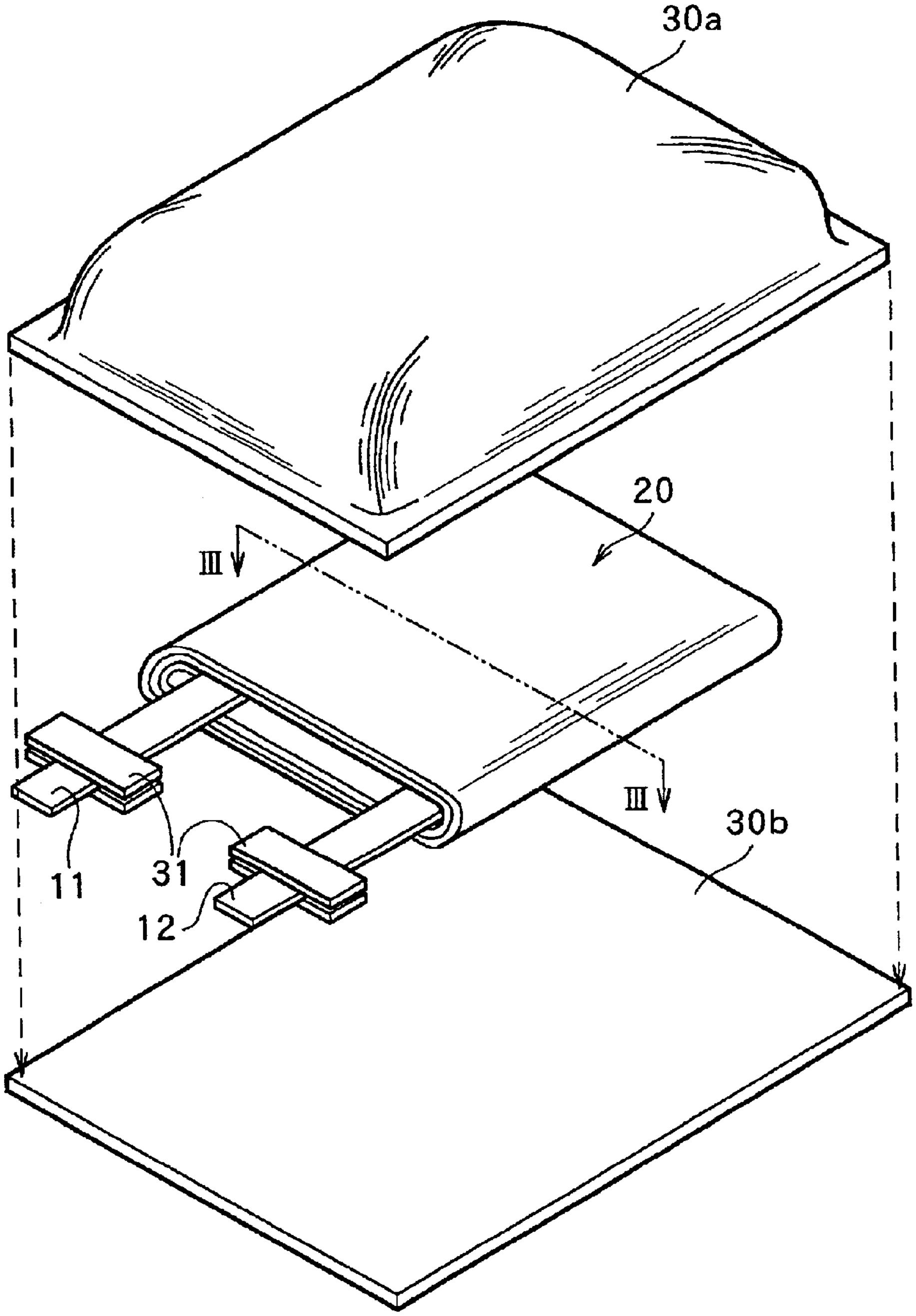
FIG. 2 is an exploded perspective view of the secondary battery shown in FIG. 1.

FIG. 1 shows the appearance of a secondary battery according to an embodiment of the invention. FIG. 2 is an exploded view of the secondary battery shown in FIG. 1. In the secondary battery, a battery device 20 to which a positive electrode lead 11 and a negative electrode lead 12 are attached is sealed in a film-state packaging member 30 (film-state case such as a laminated film in which metal foil such as aluminum foil and the like is coated with a resin, a polymer film, or a metal film).

Figure 3:
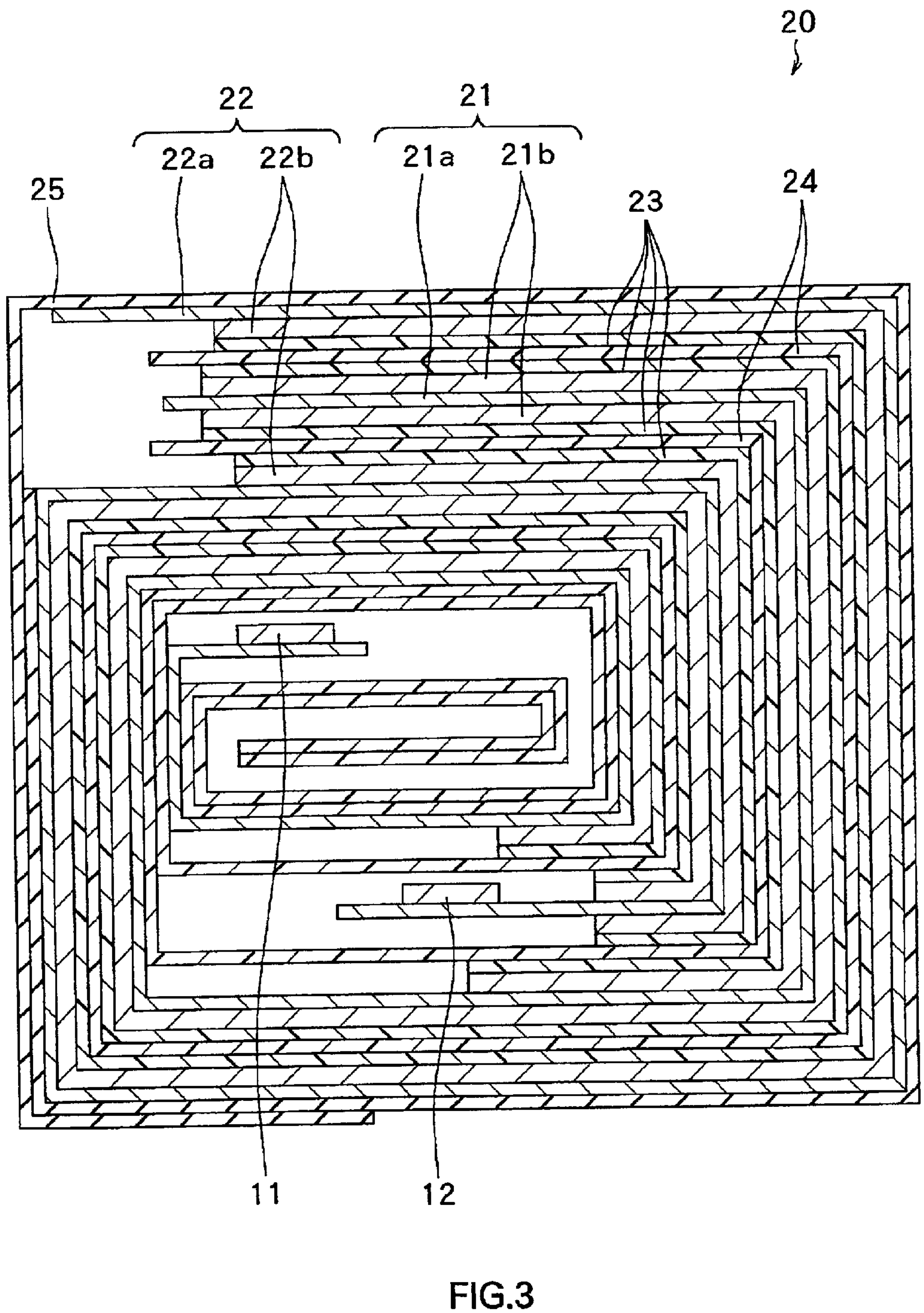
FIG. 3 is a cross section taken along a III—III line of a battery device shown in FIG. 2.

FIG. 3 is a cross section taken along a III—III line of a sectional structure of the battery device 20 in FIG. 2.

The battery device 20 is a obtained by laminating a positive electrode 21 and a negative electrode 22 with, for example, a gel-state electrolyte layer 23 and a separator 24 in-between and rolling the laminated body. The outermost peripheral portion of the negative electrode 22 is protected by a protection tape 25.

The positive electrode 21 has, for example, a positive electrode collector layer **21*a* and a positive electrode mixture layer 21*b* which is provided on one side or both sides of the positive electrode collector layer 21*a*. The positive electrode mixture layer 21*b* is not provided at one of the ends in the longitudinal direction of the positive electrode collector layer 21*a*, and there is a portion where the positive electrode collector layer 21*a* is exposed. The positive electrode lead 11** is attached to the exposed portion.

The positive electrode collector layer **21*a* is made of metal foil such as aluminum (Al) foil, nickel (Ni) foil, or stainless steel foil. The positive electrode mixture layer 21*b*** contains, for example, a positive electrode material, a conducting agent such as carbon black or graphite, and a binder such as polyvinylidene fluoride. Preferable positive electrode materials are, for example, a metallic oxide, a metallic sulfide, and a specific polymer material. One or more of the materials is/are selected according the application of the battery. To increase energy density, the most preferable material is a lithium composite oxide containing LixMO2 as a main component. In the composition formula, M denotes one or more kinds of transition metal(s). Particularly, at least one of cobalt (Co), nickel (Ni), and manganese (Mn) is preferable. The value (x) varies according to a charge/discharge state of the battery and usually satisfies $0.05 \leqq x \leqq 1.12$. Examples of such lithium composite oxide are $LiNiyCo1\text{-}yO_2$ (where, $0 \leqq y \leqq 1$) and $LiMn_2O_4$.

The negative electrode 22 has, for example, in a manner similar to the positive electrode 21, a negative electrode collector layer **22*a* and a negative a positive electrode mixture layer 21*b* which is provided on one side or both sides of the negative electrode collector layer 22*a*. The negative electrode mixture layer 22*b* is not provided at one of the ends in the longitudinal direction of the negative electrode collector layer 22***a*, and there is a portion where the negative electrode collector layer 22*a* is exposed. The negative electrode lead 12 is attached to the exposed portion.

The negative electrode collector layer 22*a* is made of metal foil such as copper (Cu) foil, nickel foil, or stainless steel foil. The negative electrode mixture layer 22*b* contains, for example, one or more of negative electrode materials capable of occluding and releasing a lithium metal or lithium.

Negative electrode materials capable of occluding and releasing lithium are metals and semiconductors each can form an alloy or compound with lithium, and alloys and compounds of the metals and semiconductors. Each of the metals, alloys, and compounds is expressed by the chemical formula DsEtLiu. In the chemical formula, D denotes at least one of a metal element and a semiconductor element capable of forming an alloy or compound with lithium, and E denotes at least one of a metal element and a semiconductor element other than lithium and D. Each of values s, t, and u satisfies $s>0$, $t\geqq 0$, and $u\geqq 0$.

Among the metal or semiconductor elements each can form an alloy or compound with lithium, Group 4B metal and semiconductor elements are preferable. More preferable elements are silicon and tin, and the most preferable element is silicon. Alloys and compounds of those elements are also preferable. Examples of the alloys and compounds are $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, and $ZnSi_2$.

Other examples of negative electrode materials capable of occluding and releasing lithium are carbonaceous materials, metal oxides and polymer materials. Examples of the carbonaceous materials are pyrocarbons, cokes, graphites, glassy carbons, polymer organic compound calcined materials, carbon fiber, and activated carbon. The cokes include pitch coke, needle coke, and petroleum coke. The polymeric compound calcined material is a material obtained by calcining a polymeric material such as phynolic resin or furan resin at an appropriate temperature so as to be carbonated. As a metal oxide, tin oxide ($SiO_2$) or the like can be mentioned. Examples of the polymeric materials are polyacetylene, and polypyrrole.

The electrolyte layer 23 is composed by, for example, a lithium salt, a non-aqueous solvent for dissolving the lithium salt, and a polymer material. Proper lithium salts are $LiPF_6$, $LiBF_4$, $LiAsF_6$, $LiClO_4$, $LiCF_3SO_3$, $Li(CF_3SO_2)_2N$, $LiC_4F_9SO_3$, LiCl and LiBr. Two or more of them may be mixed.

Appropriate non-aqueous solvents are, for example, ethylene carbonate, propylene carbonate, butylene carbonate, vinylene carbonate, γ-butyrolactone, γ-valerolactone, diethoxyethan, tetraphydrofuran, 2-methyltetrahydrofuran, 1,3-dioxolane, methyl acetate, methyl propionic acid, dimethyl carbonate, diethyl carbonate, methyl ethyl carbonate, 2,4-difluoroanisole, 2,6-difluoroanisole, and 4-bromoveratrole. Two or more kinds of the above materials may be mixed. In the case of using a laminated film which will be described hereinlater as the packaging member 30, preferably, any of the materials boiling at 150° C. or higher such as ethylene carbonate, propylene carbonate, butylene carbonate, γ-butyrolactone, 2,4-difluoroanisole, 2,6-difluoroanisole, and 4-bromoveratrole is used. When the material is easily vaporized, the packaging member 30 is expanded and the outer shape deteriorates.

Appropriate polymer materials are, for example, fluoride-contained polymers such as polyvinylidene fluoride and poly(vinylidene fluoride-co-hexafluoropropylene), ether-contained polymers such as polyacrylonitrile, acrylonitrile-butadiene rubber, acrylonitrile-butadien-styren resin, acrylonitrile polyethylene chloride diene styrene resin, acrylonitrile vinyl chloride resin, acrylonitrile methacrylate resin, acrylonitrile acrylate resin, and polyethylen oxide, and crosslinkers of the ethyl-contained polymers, and polyethyl modified siloxane. Two or more materials may be mixed. Copolymers with the following materials may be also used; acrylonitrile, vinyl acetate, methyl methacrylate, butyl methacrylate, methyl acrylate, butyl acrylate, itaconic acid, methyl acrylate hydroxide, ethyl acrylate hydroxide, acryl amide, vinyl chloride, and vinylidene fluoride. Further, copolymers with ethylene oxide, propylene oxide, methyl methacrylate, butyl methacrylate, methyl acrylate, and butyl acrylate may be also used. A copolymer of vinylidene fluoride and hexafluoropropylene, and a copolymer of ethyl modified siloxane may be used. More preferably, it is made by a micro porous polyolefin film.

The separator 24 is made by, for example, a porous film made of a polyolefin-based material such as polypropylene or polyethylene or a porous film made of an inorganic material such as ceramic nonwoven cloth. A structure in which two or more kinds of porous films are stacked, may be also used. More preferably, it is made by a micro porous polyolefin film.

The positive electrode lead 11 and the negative electrode lead 12 are led from the inside of the packaging member 30 to the outside, for example, in the same direction. A part of the positive electrode lead 11 is connected to an exposed portion in the positive electrode collector layer 21*a* in the packaging member 30. A part of the negative electrode lead 12 is connected to an exposed portion of the negative electrode collector layer 22*a* in the packaging member 30. The positive electrode lead 11 and the negative electrode lead 12 are made of a metal material such as aluminum, copper, nickel, or stainless steel in a thin film or mesh state.

In the case of using a film-state case as the packaging member 30, the packaging member 30 is constructed by, for example, two rectangular films 30*a* and 30*b* each having a thickness of about 90 μm to 110 μm. For example, the peripheral portions of the films 30*a* and 30*b* adheres to each other by fusion or by using an adhesive. When the packaging member 30 (films 30*a* and 30*b*) takes the form of a laminated film obtained by coating metal foil such as aluminum foil with a resin, the following materials can be used. Plastic materials to be used will be abbreviated as follows: polyethylene terephthalate:PET, fused polypropylane:PP, casting polypropylene:CPP, polyethylene:PE, low-density polyethylene:LDPE, high-density polyethylene:HDPE, linear low-density polyethylene:LLDPE, and nylon:Ny. Aluminum as a metal material used for a permeability-resistant barrier film is abbreviated as AL. SUS foil may be used in the same way.

The most common structure is an packaging layer/metal layer/sealant layer=PET/AL/PE. Not only the combination but also configurations of other general laminated films as shown below can be also used; packaging layer/metal film/sealant layer=Ny/AL/CPP, PET/AL/CPP, PET/AL/PET/CPP, PET/Ny/AL/CPP, PET/Ny/AL/Ny/CPP, PET/Ny/AL/Ny/PE, Ny/PE/AL/LLDPE, PET/PE/AL/PET/LDPE, and PET/Ny/AL/LDPE/CPP. Obviously, the metal film can be also made of any of metals other than AL.

In the embodiment, a laminated film in which, for example, a nylon film, aluminum foil, and a polyethylene film are laminated in this order, is used. In the laminated film, the polyethylene film faces the battery device 20. The aluminum foil in the laminated film has moisture resistance for preventing intrusion of outside air. In place of the laminated film, a laminated film having the other structure, a polymer film made of polypropylene or the like, or a metal film can be also used as the packaging member 30.

As shown in FIGS. 2 and 3, the positive electrode lead 11, the negative electrode lead 12, and the packaging member 30 closely adheres to each other with, for example, a film 31 in-between so as to prevent intrusion of the outside air. The film 31 is made of a material which adheres to the positive electrode lead 11 and the negative electrode lead 12. When each of the positive electrode lead 11 and the negative electrode lead 12 is made of any of the above-described metal materials, preferably, the film 31 is made of a polyolefin resin such as polyethylene, polypropylene, modified polyethylene, or modified polypropylene.

A non-aqueous electrolyte secondary battery having such a structure can be manufactured as follows.

First, a positive electrode mixture is prepared by mixing a positive electrode material, a conducting agent, and a binder. The positive electrode mixture is dispersed in a solvent of N-methyl-pyrrolidone or the like to thereby obtain a positive electrode mixture slurry. The positive electrode mixture slurry is applied on one side or both sides of the positive electrode collector layer 21*a*, dried, and compression molded, thereby forming the positive electrode mixture layer 21*b*. In such a manner, the positive electrode 21 is fabricated. The positive electrode mixture is not applied to one end of the positive electrode collector layer 21*a* but the end is exposed.

Next, a negative electrode mixture is prepared by mixing a negative electrode material capable of occluding and releasing lithium with a binder and dispersing the mixture in a solvent of N-methyl-pyrrolidone or the like to thereby obtain a negative electrode mixture slurry. The negative electrode mixture slurry is applied on one side or both sides of the negative electrode collector layer 22*a*, dried, and compression molded, thereby forming the negative electrode mixture layer 21*b*. In such a manner, the negative electrode 21 is fabricated. The negative electrode mixture is not applied to one end of the negative electrode collector layer 22*a* but the end is exposed.

Subsequently, the positive electrode lead 11 is attached to the exposed portion of the positive electrode collector layer 21*a* by resistance welding, ultrasonic welding, or the like, and the electrolyte is, for example, applied on the positive electrode mixture layer 21*b* to form the electrolyte layer 23. The negative electrode lead 12 is attached to the exposed portion of the negative electrode collector layer 22*a* by electric resistance welding, ultrasonic welding, or the like, and the electrolyte is, for example, applied on the negative electrode mixture layer 22*b* to form the electrolyte layer 23. After that, for example, the separator 24, the positive electrode 21 on which the electrolyte layer 23 is formed, the separator 24, and the negative electrode 22 on which the electrolyte layer 23 is formed are sequentially laminated and a laminated product is rolled, and the outermost portion is, for example, adhered by the protection tape 25. In such a manner, the battery device 20 is formed.

At the time of forming the electrolyte layer 23, for example, the materials (that is, the mixture of the lithium salt, non-aqueous solvent, and polymer material) of the electrolyte stored in a dry atmosphere are heated to about 70° C. to be polymerized. While maintaining the temperature, the resultant is applied on the positive electrode mixture layer 21*b* or the negative electrode mixture layer 22*b*, thereby preventing generation of a free acid.

After forming the battery device 20, for example, the films 30*a* and 30*b* are prepared to sandwich the battery device 20 and are contact bonded to the battery device 20 in a reduced pressure atmosphere, and the outer peripheral portions of the films 30*a* and 30*b* are bonded to each other by thermal fusion bonding or the like. Films 31 are disposed so as to sandwich the positive electrode lead 11 and the negative electrode lead 12 at the end portions of the films 30*a* and 30*b* from which the positive electrode lead 11 and the negative electrode lead 12 are led, and the peripheries of the films 30*a* and 30*b* are bonded to each other via the film 31. In such a manner, the battery shown in FIGS. 1 to 3 is completed.

The secondary battery acts as follows.

When the secondary battery is charged, for example, lithium ions are released from the positive electrode 21 and occluded by the negative electrode 22 via the electrolyte layer 23. When the secondary battery is discharged, for example, the lithium ions are released from the negative electrode 22 and occluded by the positive electrode 21 with the electrolyte layer 23 in-between. Since the concentration in mass ratio of a free acid in the electrolyte layer 23 is 60 ppm and less, the battery is prevented from being expanded. The reaction between the free acid and the lithium in the battery system is suppressed, so that excellent battery characteristics are attained.

In the embodiment, the concentration in mass ratio of the free acid in the electrolyte layer 23, that is, electrolyte is 60 ppm and less. The free acid denotes an acid generated when the lithium salt is decomposed, and ions generated when the acid is dissociated. The free acid is generated due to decomposition of the lithium salt, for example, when moisture exists or when the electrolyte is heated. Specifically, hydrogen fluoride, fluoride ion, hydrogen chloride (HCl), chloride ion (Cl—), hydrogen bromide (HBr), bromide ion (Br—), and the like can be mentioned. In the secondary battery, by suppressing the concentration of the free acid, generation of a gaseous hydride such as hydrogen fluoride gas and generation of a gas by corrosion reaction in the battery is suppressed, and the expansion of the battery is therefore prevented. Consumption of the lithium due to reaction between the free acid and the lithium is also suppressed, and an increase in internal resistance due to generation of lithium fluoride is also prevented.

As described above, in the secondary battery according to the embodiment, the concentration in mass ratio of the free acid in the electrolyte is suppressed to 60 ppm and less. Thus, generation of a gaseous hydride in the battery and generation of gas by corrosion reaction in the battery can be suppressed. Consequently, a change in shape due to expansion can be prevented with the film-state packaging member 30. In the case where the battery is stored in high-temperature environment, the shape can be maintained.

The consumption of lithium due to the reaction between the free acid and the lithium in the battery system can be also suppressed, and an increase in the internal resistance due to generation of lithium fluoride can be prevented. Thus, various battery characteristics such as capacity characteristic, shelf stability, and charge/discharge cycle can be prevented from deterioration.

A method of manufacturing a non-aqueous electrolyte secondary battery having non-aqueous gel electrolyte according to the invention will now be described. First, a positive electrode is fabricated by forming a positive electrode active material layer on a positive electrode collector. While heating the positive electrode to a temperature exceeding room temperature, a gel layer containing electrolyte is formed on the positive electrode active material layer of the positive electrode.

The gel layer containing electrolyte may be applied on one side or on each of both sides by a single-side coater. Specifically, the electrode unwound from the wound role is heated by an electrode preheater. On the electrode active material layer on one side of the electrode, a composition for forming the gel layer containing electrolyte is applied from the coater head. The applied composition for forming the gel layer containing electrolyte is dried when passed through a dryer and becomes a gel layer containing electrolyte. The electrode on which the gel layer containing electrolyte is formed, is taken up by the wound role.

The gel layer containing electrolyte can be also simultaneously coated on both sides by a double-side coater. The electrode unwound from the wound role is heated by the electrode preheater, and a composition for forming the gel layer containing electrolyte is applied from the coater head simultaneously on both sides of the electrode active material layer. The applied composition for forming the gel layer containing electrolyte is dried when passed through a dryer and becomes a gel layer containing electrolyte. The electrode on which the gel layer containing electrolyte is formed, is taken up by the wound role.

When pressing is necessary, for example, after forming the electrode active material layer and before forming the gel layer containing the electrolyte, the electrode can be pressed by a general press roller.

In a manner similar to the case of fabricating the positive electrode, by forming a negative electrode active layer on the negative electrode collector, the negative electrode is fabricated. Subsequently, while heating the negative electrode to a temperature exceeding the room temperature, a gel layer containing electrolyte solution is formed on a negative electrode active layer of the negative electrode.

The gel layer containing electrolyte on the positive electrode side and that on the negative electrode side adheres to each other, thereby obtaining an electrode body.

The obtained electrode body may be assembled to thereby achieving a completed battery by any of methods such as; a method of forming a slit in the electrode on which the gel layer containing electrolyte is formed and assembling the electrode; a method of forming a slit in the electrode first, forming the gel layer containing the electrolyte solution, and assembling the electrode; and a method as a combination of the methods, of forming the gel layer containing the electrolyte solution and forming a slit in one of the electrodes, forming a slit and then forming the gel layer containing the electrolyte solution on the other electrode, and assembling the electrodes. A method of forming the gel layer containing electrolyte only one side of an electrode, forming a slit, forming the gel layer on the other face of the electrode, and assembling the electrode may be also used.

In the battery device, after leads are welded to the portions in the collector, in which the active material layer is not applied, the electrodes are laminated so that the active material layers of the electrodes face each other. The electrodes may be laminated by stacking electrodes which are cut in a desired size, winding stacked electrodes, and the like.

The battery device fabricated in such a manner is sandwiched by the laminated films, the resultant is pressed to increase the adhesion of the gel layers containing electrolyte on both electrodes and is sealed, so that the battery device is not exposed to outside air. In such a manner, a non-aqueous gel polymer secondary battery using the aluminum laminate pack as shown in FIG. 1 is obtained.

The invention is not limited to the method of preheating the electrode before coating the composition for forming the gel layer containing electrolyte in the invention. A method of passing a temperature-controlled roll, a method of blowing temperature-controlled air, a method of providing an infrared ray lamp, or the like can be mentioned.

EXAMPLE

Further, examples of the invention will be described in detail.

Examples 1-1 to 1-31

First, a copolymer of vinylidene fluoride and hexafluoropropylene as polymer materials was dissolved in a solvent obtained by mixing propylene carbonate and ethylene carbonate, and further, $LiPF_6$ was dissolved as a lithium salt. The mixing ratio in volume of the solvent and the polymeter material, specifically, propylene carbonate:ethylene carbonate:copolymer was set to 4:4:1. $LiPF_6$ was dissolved at the rate of 0.74 mol/dm$^3$.

The mixture solution was stored in a drying chamber for one week or longer and heated to about 70° C. so as to be gelled. In such a manner, electrolytes of the Examples 1-1 to 1-31 were obtained. The electrolytes of the Examples 1-1 to 1-31 were fabricated separately under the same conditions.

Figure 4:
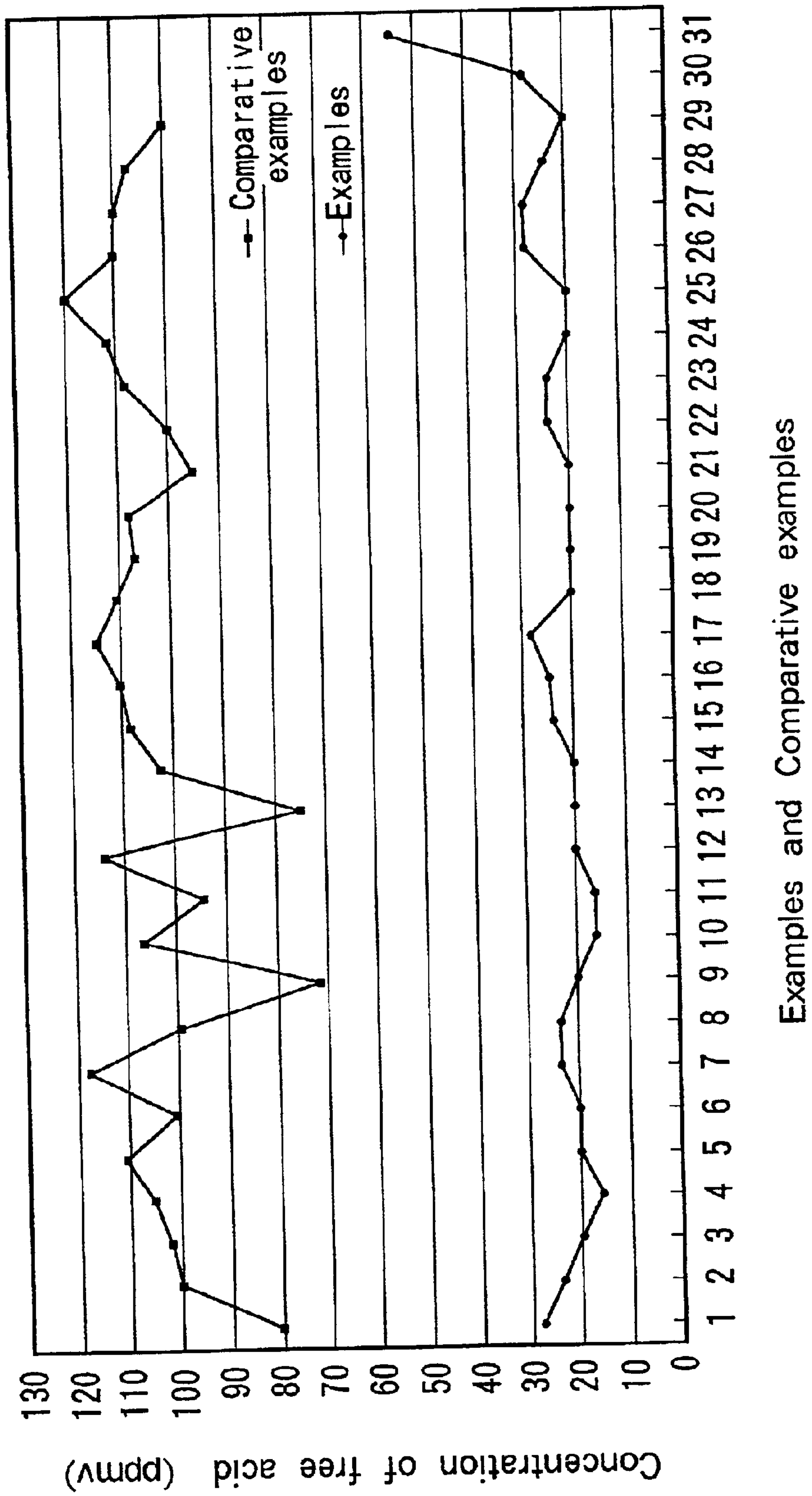
FIG. 4 is a characteristic diagram showing concentration of a free acid in each of electrolytes of examples and comparative examples.

The concentration of the free acid (hydrogen fluoride in this case) of the obtained electrolyte was measured. To be specific, the electrolyte is dissolved in cold water of 1.5° C. or lower so as not to be hydrolyzed. After adding bromothymol blue as an indicator, acid-bace neutrization titration was carried out by using a sodium hydroxide (NaOH) solution of 0.01 mol/dm$^3$, thereby measuring the concentration. The results are shown in FIG. 4. In FIG. 4, the vertical axis denotes concentration (unit: ppm) in mass ratio of the free acid, and the lateral axis denotes numbers of the example and comparative examples which will be described hereinlater. As shown in FIG. 4, the concentration in mass ratio of the free acid in each of the electrolytes of the examples is 60 ppm and less.

As Comparative Examples 1-1 to 1-29 of the present examples, electrolytes were fabricated in a manner similar to the examples except that the storage time in the dying chamber was set to one day and the heating temperature was set to 80 to 90° C. The concentration of the free acid was measured with respect to each of Comparative Examples 1-1 to 1-29 in a manner similar to the examples. The result is also shown in FIG. 4. As shown in FIG. 4, the concentration at mass ratio of the free acid in each of the electrolytes in Comparative Examples 1-1 to 1-29 was 70 ppm or higher.

Secondary batteries as shown in FIGS. 1 to 3 were fabricated by using the electrolytes of the examples and comparative examples. First, a positive electrode mixture was prepared by mixing lithium-cobalt complex oxide ($LiCoO_2$) as a positive electrode material, graphite as a conducting agent, and polyvinylidene fluoride as a binder. The positive electrode mixture was dispersed in N-methylpyrrolidone as a solvent to thereby obtain a positive electrode mixture slurry. The positive electrode mixture slurry was applied on both sides of the positive electrode collector layer 21*a* made of aluminum foil, dried, and compression molded, thereby forming the positive electrode mixture layer 21*b*. In such a manner, the positive electrode 21 was fabricated. A negative electrode mixture was prepared by mixing graphite powders as a negative electrode material with polyvinylidene fluoride as a binder, the mixture was dispersed in a solvent of N-methyl-pyrrolidone to thereby obtain a negative electrode mixture slurry. The negative electrode mixture slurry was applied on both sides of the negative electrode collector layer 22*a* made of copper foil, dried, and compression molded, thereby forming the negative electrode mixture layer 22*b*. In such a manner, the negative electrode 22 was fabricated.

After forming the positive and negative electrodes, the positive electrode lead 11 was attached to the positive electrode collector layer 21*a* and the electrolyte was applied on the positive electrode mixture layer 21*b* to form the electrolyte layer 23. The negative electrode lead 12 was attached to the negative electrode collector layer 22*a* and the electrolyte was applied on the negative electrode mixture layer 22*b* to form the electrolyte layer 23. After that, a porous polypropylene film as the separator 24 was prepared, and the separator 24, the positive electrode 21, the separator 24, and the negative electrode 22 were sequentially laminated and a laminated product was rolled. The outermost portion was adhered by the protection tape 25. In such a manner, the battery device 20 was formed.

After forming the battery device 20, two metal foil laminated films each obtained by laminating a nylon film, aluminum foil, and a polyethylene film in this order were prepared, and the battery device 20 was sandwiched by the metal foil laminated films so that the film 31 for improving the adhesion was disposed at the end portions from which the positive electrode lead 11 and the negative electrode lead 12 were led. After that, the laminated films were contact bonded to the battery device 20, and the peripheries of the metal foil laminated films were fusion bonded to each other, thereby obtaining a secondary battery having a length of 62 mm, a width of 35 mm, and a thickness of about 3.8 mm.

Each of the secondary batteries of examples and comparative examples were repeatedly charged and discharged, a change in shape after the charging was examined, and an initial discharge capacity was measured. The charging was performed with a constant current of 250 mA until the battery voltage reaches 4.2V and then by a constant voltage of 4.2V until the total charging time reached nine hours. On the other hand, the discharging was performed with a constant current of 250 mA until the battery voltage reaches 3V.

As a result, a change in the shape of the battery after charging was hardly seen in each of the secondary batteries of Examples 1-1 to 1-31. On the other hand, in the secondary battery of Comparative Examples 1-1 to 1-29, a gas is generated between the packaging member 30 and the battery device 20 or in the battery device 20 in almost all of them. Each of the secondary batteries was expanded to a thickness of about 4.0 mm to 4.4 mm.

Figure 5:
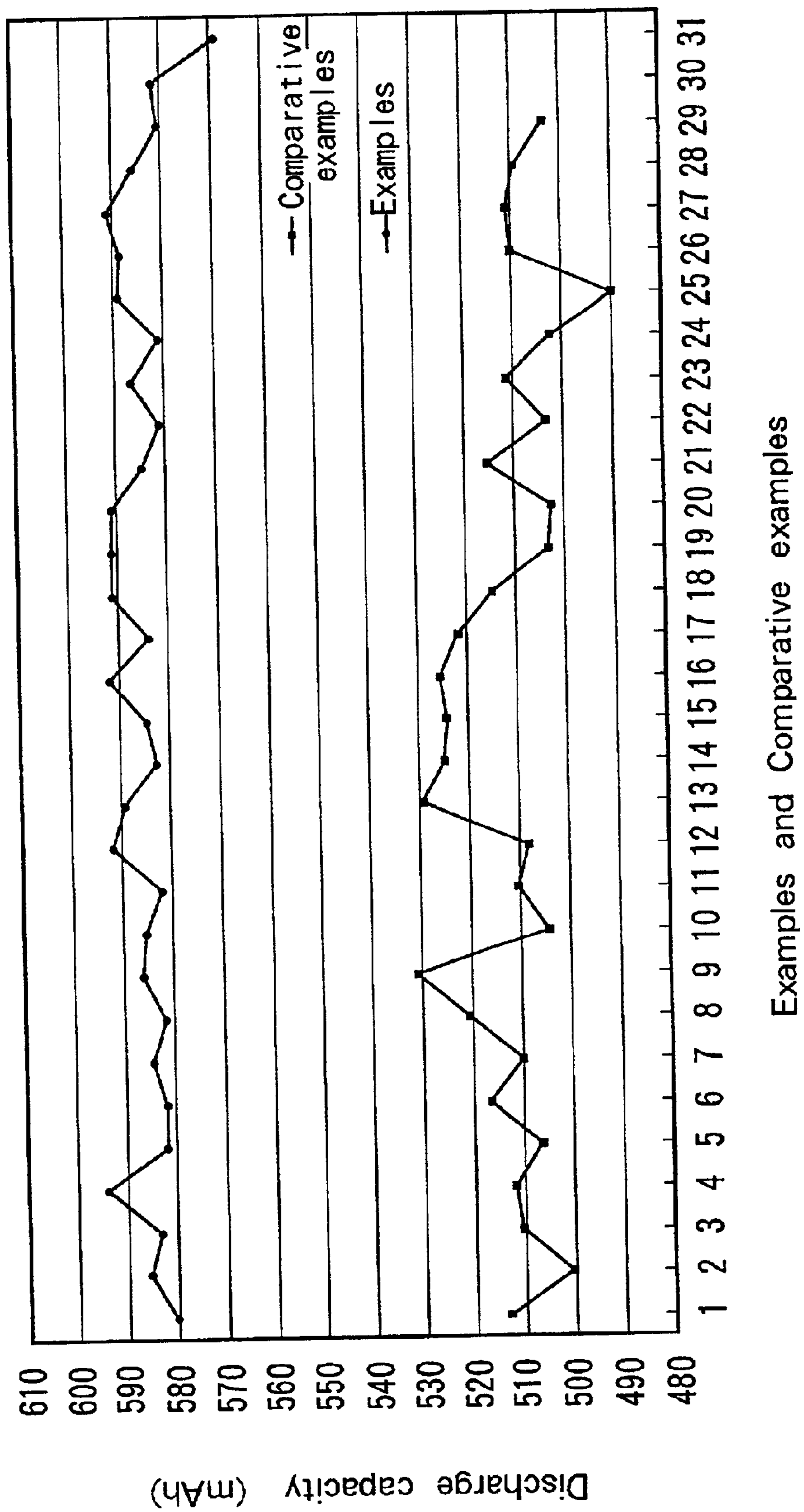
FIG. 5 is a characteristic diagram showing discharge capacity of a secondary battery in each of examples and comparative examples.

FIG. 5 shows the results of the initial discharge capacity. In FIG. 5, the vertical axis denotes discharge capacity (unit; mAh), and the vertical axis denotes numbers of the examples and the comparative examples. As understood from FIG. 5, the discharge capacity larger than 565 mAh was obtained in each of Examples 1-1 to 1-31. In contrast, the discharge capacity smaller than 535 mAh was obtained in each of Comparative Examples 1-1 to 1-20. When they are compared with each other by using the average values, the average value of the examples is 586 mAh and that of the comparative examples is 512 mAh. In the examples, the discharge capacity larger than that in the comparative examples by 14.5% was obtained. Variations in the values in the examples are smaller than those in the comparative examples. Thus, stable results were derived.

Further, each of the secondary batteries in the examples and the comparative examples was charged and discharged for 100 cycles. The ratio of the discharge capacity in the $100^{th}$ cycle to that in the $1^{st}$ cycle (that is, the capacity sustain ratio in the $100^{th}$ cycle) was calculated. As a result, the average value of the capacity sustain ratio of Examples 1-1 to 1-31 is 95%. On the other hand, the average value of the capacity sustain ratio of the comparative examples is 87%, which is lower than the average value of the examples.

That is, it was found that, in fabrication of the electrolyte, after sufficiently drying the lithium salt, solvent, and polymer material, the electrolyte is gelled at low temperature of about 70° C., the concentration of the free acid in the electrolyte can be suppressed to 60 ppm or lower at the mass ratio, a change in shape of the battery can be effectively prevented, and stable and excellent capacity characteristics and charge/discharge cycle characteristics can be obtained.

Examples 2-1 to 2-3

As Examples 2-1 to 2-3, secondary batteries were fabricated in a manner similar to Examples 1-1 to 1-31 except that the concentration in mass ratio of the free acid in the electrolyte was changed as shown in Table 1. As Comparative Examples 2-1 to 2-3 of Examples 2-1 to 2-3, secondary batteries were fabricated in a manner similar to the examples except that the concentration of the free acid in the electrolyte as shown in Table 1.

TABLE 1

| | concentration in mass ratio of free acid (ppm) | initial discharge capacity (mAh) | capacity sustain ratio (%) | change in shape |
|---|---|---|---|---|
| Example 2-1 | 25 | 582 | 95 | hardly occurs |
| Example 2-2 | 50 | 584 | 95 | hardly occurs |
| Example 2-3 | 60 | 571 | 93 | hardly occurs |
| Comparative Example 2-1 | 100 | 511 | 89 | expanded |
| Comparative Example 2-2 | 200 | 494 | 84 | expanded |
| Comparative Example 2-3 | 400 | 481 | 81 | expanded |

The concentration of the free acid in the electrolyte in each of Examples 2-1 to 2-3 and Comparative Examples 2-1 to 2-3 was controlled by adjusting the drying time in the drying chamber and the gelling temperature. Specifically, in Example 2-1, the drying time was set as one week and the gelling temperature was set as 70° C. In Example 2-2, the drying time was set as 5 days, and the gelling temperature was set as 70° C. In Example 2-3, the drying time was set as 5 days, and the gelling temperature was set as 75° C. In Comparative Example 2-1, the drying time was set as one day, and the gelling temperature was set as 80° C. to 90° C. In Comparative Example 2-2, there is no drying time, and the gelling temperature was set as 85° C. to 95° C. In Comparative Example 2-3, there is no drying time, and the gelling temperature was set as 95° C. to 105° C.

With respect to the secondary batteries of Examples 2-1 to 2-3 and Comparative Examples 2-1 to 2-3, a change in shape after charging, initial discharge capacity, and capacity sustain ratio in the $100^{th}$ cycle were measured in a manner similar to Examples 1-1 to 1-31. Table 1 shows the results.

As understood from Table 1, when the concentration of the free acid in the electrolyte is suppressed to 60 ppm in mass ratio, a change in shape of the battery can be prevented and excellent capacity characteristic and charge/discharge characteristic can be achieved.

A second aspect of the invention will now be described. Obviously, the invention is not limited to the following examples.

Example 3

(Fabrication of Positive Electrode)

Suspension of the following composition of a positive electrode active material layer was mixed by a disper for four hours and was coated in a pattern on both sides of aluminum foil having a thickness of 20 μm. The coating pattern includes a coated portion having a length of 160 mm and an uncoated portion having a length of 30 mm, which are repeatedly provided on both sides. The start and end positions of coating on both sides were controlled to coincide with each other.

| Composition of positive electrode active material layer | parts by weight |
|---|---|
| $LiCoO_2$ | 100 |
| polyvinylidene fluoride (average molecular weight: 300,000) | 5 |
| carbon black (average particle diameter: 15 nm) | 10 |
| N-methyl-2-pyrrolidone | 100 |

$LiCoO_2$ has, as shown in Table 2, average particle diameter of 10 μm, the minimum particle diameter of 5 μm, the maximum particle diameter of 18 μm, and specific surface area of 0.25 m2/g.

TABLE 2

| | Particle size distribution and specific surface area of positive electrode active material | | | |
|---|---|---|---|---|
| | average particle diameter (50% particle diameter) μm | minimum particle diameter (5% particle diameter) μm | minimum particle diameter (95% particle diameter) μm | Specific surface area $m^2/g$ |
| Example 3 | 10 | 5 | 18 | 0.25 |
| Example 4 | 16 | 7 | 40 | 0.23 |
| Example 5 | 22 | 9 | 50 | 0.21 |
| Comparative Example 3 | 6 | 3 | 12 | 0.51 |
| Comparative Example 4 | 8 | 5 | 16 | 0.38 |

The row film of which both sides are coated with the positive electrode, was pressed with linear pressure of 300 kg/cm. After the press, the thickness of the positive electrode was 100 μm and the density of the positive electrode active material layer was 3.45 g/cc.

(Fabrication of Negative Electrode)

Suspension of the following composition of a positive electrode active material layer was mixed by a disper for four hours and was coated in a pattern on both sides of copper foil having a thickness of 10 μm. The coating pattern includes a coated portion having a length of 160 mm and an uncoated portion having a length of 30 mm, which are repeatedly provided on both sides. The start and end positions of coating on both sides were controlled to coincide with each other.

| Composition of negative electrode active material layer | parts by weight |
|---|---|
| artificial graphite (average particle diameter: 20 μm) | 100 |
| polyvinylidene fluoride (average molecular weight: 300,000) | 15 |
| N-methyl-2-pyrrolidone | 200 |

The row sheet of which both sides are coated with the negative electrode was pressed with linear pressure of 300 kg/cm. After the press, the thickness of the negative electrode was 90 μm and the density of the negative electrode active material layer was 1.30 g/cc.

Formation of Gel Layer Containing Electrolyte Solution

The composition for forming the gel layer containing the electrolyte solution was mixed by a disper for one hour in a heated state at 70° C. and was coated in a pattern on the negative electrode active material layers on both sides of the negative electrode collector so as to have a thickness of 20 μm and was coated in a pattern on the positive electrode collector active material layers on both sides of the positive electrode collector so as to have a thickness of 20 μm. A dryer was controlled so that only dimethyl carbonate evaporates substantially.

| Composition for forming gel layer containing electrolyte solution | parts by weight |
|---|---|
| poly(hexafluoropropylene-vinylidene fluoride) copolymer *1 | 5 |
| dimethyl carbonate (DMC) | 75 |
| electrolyte solution (LiPF6: 1.2 mole/litter) *2 | 20 |

*1: content of hexafluoropropylene = 6 parts by weight
*2: solvents used for electrolyte solution: ethylene carbonate (EC)/propylene carbonate (PC)/γ-butyrolactone (GBL) = 4/3/3

At the time of forming the gel layer containing electrolyte solution, the positive and negative electrodes were heated by setting an electrode preheater at a predetermined temperature 60° C.

The row negative electrode on which the gel layer containing the electrolyte solution was cut into 40 mm width to fabricate a band-shaped pancake. The row positive electrode was cut into 38 mm width to fabricate a band-shaped electrode pancake.

(Fabrication of Battery)

Figure 6:
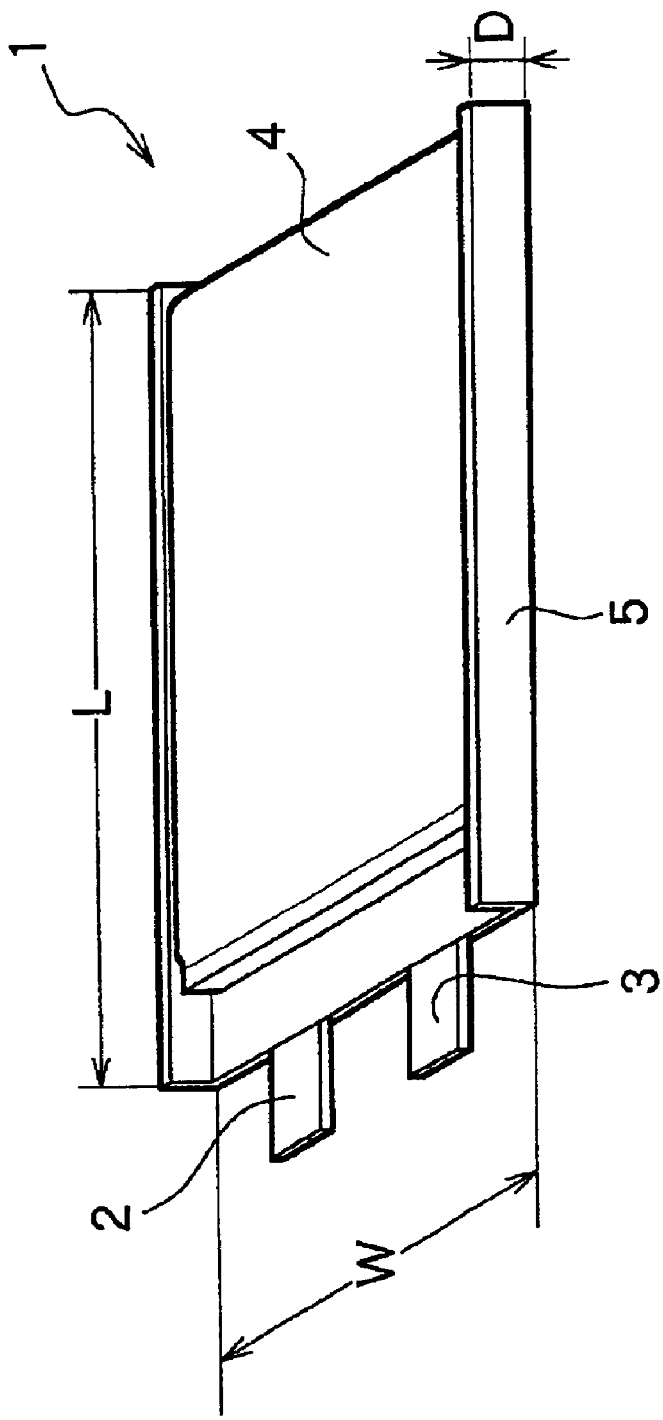
FIG. 6 is a perspective view showing the configuration of a non-aqueous electrolyte secondary battery according to second and third aspects of the invention.

After that, the leads were welded to both the positive and negative electrodes, and the positive and negative electrodes were adhered to each other so that their electrode active material layers were in contact with each other and contact-bonded. The resultant was sent to an assembling section where the battery device was formed. The battery device was sandwiched so as to be covered with the laminated films. By welding the laminated films, the non-aqueous gel polymer secondary battery as shown in FIG. 6 was fabricated. As described above, the non-aqueous gel polymer secondary battery of the embodiment used an aluminum laminate pack. The laminated film was obtained by stacking nylon, aluminum, and casting polypropylene (CPP) in accordance with the order from the outside. The thickness of nylon was 30 μm, that of aluminum was 40 μm, and that of CPP was 30 μm. The thickness of the whole stack layers was 100 μm.

Example 4

This example is similar to Example 3 except that physical properties of the positive electrode active material were different. Specifically, $LiCoO_2$ as the positive electrode active material has, as shown in Table 2, average particle diameter of 16 μm, minimum particle diameter of 7 μm, maximum particle diameter of 40 μm, and specific surface area of 0.23 $m^2/g$.

Example 5

This example is similar to Example 3 except that physical properties of the positive electrode active material are different. Specifically, $LiCoO_2$ as the positive electrode active material has, as shown in Table 2, average particle diameter of 22 μm, minimum particle diameter of 9 μm, maximum particle diameter of 50 μm, and specific surface area of 0.21 $m^2/g$.

Comparison Example 3

This example is similar to Example 3 except that physical properties of the positive electrode active material are different. Specifically, $LiCoO_2$ as the positive electrode active material has, as shown in Table 2, average particle diameter of 6 μm, minimum particle diameter of 3 μm, maximum particle diameter of 12 μm, and specific surface area of 0.51 $m^2/g$.

Comparison Example 4

This example is similar to Example 3 except that physical properties of the positive electrode active material are different. Specifically, $LiCoO_2$ as the positive electrode active material has, as shown in Table 2, average particle diameter of 8 μm, minimum particle diameter of 5 μm, maximum particle diameter of 16 μm, and specific surface area of 0.38 $m^2/g$.

Examples 3 to 5 and Comparative Examples 3 and 4 fabricated as described above were evaluated. Evaluation items are expansion ratio and capacity sustain ratio.

First, the expansion ratio will be described. The expansion ratio of a battery was measured as follows. A plurality of batteries of the examples and the comparative examples were prepared. Each battery was charged under the conditions of 4.2V, 500 mA, and two hours and thirty minutes, and the thickness of the battery was measured. After that, the batteries were stored under the conditions of constant temperature and fixed period such that the batteries were stored at 23° C. for one month, 35° C. for one month, 45° C. for one month, 60° C. for one month, and 90° C. for four hours. The thickness of each of the batteries one hour after the end of storage. A variation in thickness before and after the storage is used as an expansion amount. The expansion ratio is defined as follows.

Expansion ratio(%)=(expansion amount/thickness of a battery before storage)×100

The following method of measuring the thickness of a battery was used. Specifically, the battery was placed on a stand having a horizontal plane. A disc which is parallel to the plane and is larger than the surface portion of a battery was lowered to the battery. The thickness of the battery was measured in a state where a load of 300 g was applied to the disc. When the surface portion of the battery was not a flat face, the highest part of the surface portion of the battery was used to measure thickness.

In FIG. 6, L=62 mm, W=35 mm, and D=3.8 mm. The device area is 56 mm×34 mm=1904 $mm^2$. When the surface portion of a battery is a flat face, pressure to be applied on the battery is 0.16 $gf/mm^2$.

The capacity sustain ratio will now be described. First, each of the batteries was charged with constant current and constant voltage of hour rate of 5 (0.2C) for 15 hours to the upper limit of 4.2V and discharged with constant current of 0.2C, and the discharge was finished at the final voltage of 2.5V. The discharge capacity was determined in such a manner and was set as 100%. After charging batteries under the above-described charging conditions, the batteries were stored under the conditions of 23° C. for one month, 35° C. for one month, 45° C. for one month, 60° C. for one month, and 90° C. for four hours. The batteries were discharged under the above-described discharging conditions. The charging and discharging was repeated five more times. The discharge capacity at the fifth time was measured and is displayed in % so as to be compared with the discharge capacity of 100%. The capacity of 100% in each of Examples 3 to 5 and Comparative Examples 3 and 4, that is, the capacity before storage was almost equal to each other.

The results of measurement of the expansion ratio after storage are as shown in Table 3. When the expansion ratio is 5% or lower, there is no problem in practice. Consequently, the expansion ratio of 5% was used as a reference of evaluation. As understood from Table 3, Example 3 has the expansion ratio ranging from 0 to 5% and proves itself excellent. Example 4 has the expansion ratio ranging from 0 to 3% and proves itself excellent. Example 5 has the expansion ratio ranging from 0 to 2% and proves itself excellent. In contrast, Comparative Example 3 has a high expansion ratio of 10 to 25% except for the condition of 23° C. for one month. Comparative Example 4 has a high expansion ratio of 9 to 20% except for the condition of 23° C. for one month.

TABLE 3

| Expansion ratio after storage | | | | | |
|---|---|---|---|---|---|
| | Expansion ration | | | | |
| Condition Temperature Storage | Example 3 (average particle=10 μm) | Example 4 (average particle=16 μm) | Example 5 (average particle=22 μm) | Comparative Example 3 (average particle=6 μm) | Comparative Example 4 (average particle=8 μm) |
| 23° C. one month | 0% | 0% | 0% | 0% | 0% |
| 35° C. one month | 3% | 2% | 2% | 10% | 9% |
| 45° C. one month | 3% | 2% | 2% | 15% | 12% |
| 60° C. one month | 3% | 3% | 2% | 20% | 15% |
| 90° C. four hours | 5% | 3% | 2% | 25% | 20% |

It is understood from the above that the positive electrode active material used for Examples 3 to 5 produces an excellent result with respect to the expansion ratio. Specifically, in Examples 3 to 5, the average particle diameter of the positive electrode active material lies in a range from 10 to 22 μm. The positive electrode active material has the minimum particle diameter of 5 μm, the maximum particle diameter of 50 μm, and the specific surface area of 0.25 m2/g and less.

It is considered that the positive electrode active materials in Examples 3 to 5 obtain excellent results with respect to the expansion ratio for the following reason. The cause of expansion of a battery when the battery is stored at high temperature is regarded as generation of gas. The cause of the generation of gas is considered that, due to contact between the surface of the positive electrode active material with the electrolyte solution, reaction occurs on the surface, and cracked gas of $CO_2$ or hydrocarbon generates. Since the surface area of the positive electrode active material of each of Examples 3 to 5 is smaller than that of the positive electrode active material of each of Comparative Examples 3 and 4, it is presumed that due to the small surface area for reaction, decomposition reaction is suppressed. As a result, the expansion of the battery based on the cracked gas is suppressed.

The results of measurement of the capacity sustain ratio after storage are as shown in Table 4. As understood from Table 4, Example 3 has the capacity sustain ratio ranging from 94 to 98% and proves itself excellent. Example 4 has the capacity sustain ratio ranging from 96 to 98% and proves itself excellent. Example 5 has the capacity sustain ratio ranging from 97 to 98% and proves itself excellent. In contrast, Comparative Example 3 has a capacity sustain ratio of 90 to 95% which is lower as compared with Examples 3 to 5. Comparative Example 4 has a capacity sustain ratio of 92 to 96% which is lower as compared with Examples 1 to 3.

TABLE 4

Capacity sustain ratio after storage

| | Capacity sustain ratio | | | | |
|---|---|---|---|---|---|
| Condition Temperature Storage | Example 3 (average particle=10 μm) | Example 4 (average particle=16 μm) | Example 5 (average particle=22 μm) | Comparative Example 3 (average particle=6 μm) | Comparative Example 4 (average particle 8= μm) |
| 23° C. one month | 97% | 98% | 98% | 95% | 96% |
| 35° C. one month | 96% | 98% | 98% | 94% | 95% |
| 45° C. one month | 95% | 97% | 97% | 92% | 93% |
| 60° C. one month | 94% | 96% | 98% | 90% | 92% |
| 90° C. four hours | 98% | 98% | 98% | 90% | 94% |

It is understood from the above that the positive electrode active material used for Examples 3 to 5 produces an excellent result with respect to the capacity sustain ratio after storage. Specifically, in Examples 3 to 5, the average particle diameter of the positive electrode active material lies in a range from 10 to 22 μm. The positive electrode active material has the minimum particle diameter of 5 μm, the maximum particle diameter of 50 μm, and the specific surface area of 0.25 m2/g and less.

It is considered that the positive electrode active materials in Examples 3 to 5 obtain excellent results with respect to the capacity sustain ratio for the following reason. Since the surface area of the positive electrode active material of each of Examples 3 to 5 is smaller than that of the positive electrode active material of each of Comparative Examples 3 and 4, it is presumed that due to the small surface area for reaction, decomposition reaction is suppressed. Due to reduction in the area for reaction, speed of deterioration in the positive electrode active material is also suppressed.

From the above, according to the second aspect of the invention, the expansion which occurs when a non-aqueous gel or solid electrolyte polymer secondary battery using a metal foil case laminated electrical insulator material is stored at high temperature and is a conspicuous problem in the secondary battery can be suppressed. The discharge capacity sustain ratio can be improved. Specifically, the positive electrode active material is a composite oxide made of Li and other metal, and the average particle diameter of the positive electrode active material lies within the range from 10 to 22 μm, the specific surface area is reduced, the reaction area is decreased and, as a result, the generation of gas is suppressed when the battery is stored at high temperature. The expansion of a battery which occurs when the battery is stored at a high temperature can be suppressed. Thus, the discharge capacity sustain ratio can be improved.

Examples of a third aspect of the invention will be described hereinbelow.

Example 6

(Fabrication of Positive Electrode)

Suspension of the following composition of the positive electrode active material layer was mixed by a disper for four hours and was coated in a pattern on both sides of aluminum foil having a thickness of 20 μm. The coating pattern includes a coated portion having a length of 160 mm and an uncoated portion having a length of 30 mm, which are repeatedly provided on both sides. The start and end positions of coating on both sides were controlled to coincide with each other.

| Composition of positive electrode active material layer | parts by weight |
|---|---|
| $LiCoO_2$(average particle diameter: 10 μm) | 100 |
| polyvinylidene fluoride (average molecular weight: 300,000) | 5 |
| carbon black (average particle diameter: 15 nm) | 10 |
| N-methyl-2-pyrrolidone | 100 |

The above-described positive electrode active material $LiCoO_2$ contains one part by weight of lithium carbonate ($Li_2CO_3$).

The positive electrode active material $LiCoO_2$ contains 400 ppm of moisture. The moisture in the positive electrode active material $LiCoO_2$ was reduced to 400 ppm by drying the positive electrode active material $LiCoO_2$ in vacuum and controlling the drying time.

Quantitative analysis of the moisture was conducted as follows. 0.5 g of the sample of the positive electrode active material was extracted and heated at 250° C. to vaporize the moisture, and the content of moisture was measured by a Karl Fischer measuring apparatus.

Quantitative analysis of the content of lithium carbonate was made as follows. 2.0 g of the positive electrode active material was extracted, and analyzed by using the A.G.K. $CO_2$ analysis method (titration method described in JISR9101).

Although the moisture is also contained in other materials such as the negative electrode material, gel, electrolyte, the moisture contained in each of them is very little. The moisture existing in a battery can be therefore determined by controlling the moisture contained in the positive electrode active material.

The row sheet of which both sides were coated with the positive electrode was pressed with linear pressure of 300 kg/cm. After the press, the thickness of the positive electrode was 100 $\mu$m and the density of the positive electrode active material layer was 3.45 g/cc.

Fabrication of negative electrode

Suspension of the following composition of the negative electrode active material layer was mixed by a disper for four hours and was coated in a pattern on both sides of copper foil having a thickness of 10 $\mu$m. The coating pattern includes a coated portion having a length of 160 mm and an uncoated portion having a length of 30 mm, which are repeatedly provided on both sides. The start and end positions of coating on both sides were controlled to coincide with each other.

| Composition of negative electrode active material layer | parts by weight |
|---|---|
| artificial graphite (average particle diameter: 20 $\mu$m) | 100 |
| polyvinylidene fluoride (average molecular weight: 300,000) | 15 |
| N-methyl-2-pyrrolidone | 200 |

The row sheet of which both sides are coated with the negative electrode was pressed with linear pressure of 300 kg/cm. After the press, the thickness of the negative electrode was 90 $\mu$m and the density of the negative electrode active material layer was 1.30 g/cc.

(Formation of Gel Layer Containing Electrolyte Solution)

The composition for forming the gel layer containing the electrolyte solution was mixed by a disper for one hour in a heated state at 70° C. and was coated in a pattern on the negative electrode active material layers on both sides of the negative electrode collector so as to have a thickness of 20 $\mu$m and was coated in a pattern on the positive electrode active material layers on both sides of the positive electrode collector so as to have a thickness of 20 $\mu$m. A dryer was controlled so that only dimethyl carbonate evaporates substantially.

| Composition for forming gel layer containing electrolyte solution | parts by weight |
|---|---|
| poly(hexafluoropropylene-vinylidene fluoride) copolymer *1 | 5 |
| dimethyl carbonate (DMC) | 75 |
| electrolyte solution (LiPF6: 1.2 mole/litter) *2 | 20 |

*1: content of hexafluoropropylene = 6 parts by weight
*2: solvents used for electrolyte solution: ethylene carbonate (EC)/propylene carbonate (PC)/γ-butyrolactone (GBL) = 4/3/3

At the time of forming the gel layer containing electrolyte solution, the positive and negative electrodes were heated by setting an electrode preheater at a predetermined temperature of 60° C.

The row negative electrode on which the gel layer containing the electrolyte solution was formed, was cut into 40 mm width to fabricate a negative electrode band. The row positive electrode was cut into 38 mm width to fabricate a band-shaped positive electrode body.

(Fabrication of Battery)

After that, the leads were welded to both the positive and negative electrodes, and the positive and negative electrodes were adhered to each other so that their electrode active material layers were in contact with each other and contact-bonded. The resultant was sent to an assembling section where the battery device was formed. The battery device was sandwiched so as to be covered with the metal laminated films. By welding the metal laminated films, the non-aqueous gel polymer secondary battery as shown in FIG. 6 was fabricated. As described above, the non-aqueous gel polymer secondary battery of the embodiment uses an aluminum laminate case. The metal laminated film was obtained by stacking nylon, aluminum, and casting polypropylene (CPP) in accordance with the order from the outside. The thickness of nylon is 30 $\mu$m, that of aluminum is 40 $\mu$m, and that of CPP is 30 $\mu$m. The thickness of the whole stack layers is 100 $\mu$m.

Examples 7 to 21

Examples 7 to 21 are similar to Example 1 except for the contents of the lithium carbonate and moisture in the positive electrode active material.

Specifically, the content of lithium carbonate in each of Examples 7 to 9 is 1 part by weight. The contents of moisture of Examples 7 to 9 are 300 ppm, 200 ppm, and 100 ppm, respectively.

The content of lithium carbonate in each of Examples 10 to 13 is 0.15 percent by weight. The contents of moisture of Examples 10 to 13 are 400 ppm, 300 ppm, 200 ppm, and 100 ppm, respectively.

The content of lithium carbonate of each of Examples 14 to 17 is 0.07 percent by weight. The contents of moisture of Examples 14 to 17 are 400 ppm, 300 ppm, 200 ppm, and 100 ppm, respectively.

The content of lithium carbonate of each of Examples 18 to 21 is 0.01 percent by weight. The contents of moisture of Examples 18 to 21 are 400 ppm, 300 ppm, 200 ppm, and 100 ppm, respectively.

Examples 6 to 21 fabricated as described above were evaluated. Evaluation item is an expansion ratio. The expansion ratio will now be described. The expansion ratio was measured as follows. First, each of the batteries in the examples was charged under the conditions of 4.2V, 500 mA, and two hours and thirty minutes, and the thickness of the battery was measured. After that, the batteries were stored at 90° C. for four hours. The thickness of each of the batteries one hour after the end of storage was measured. A variation in thickness before and after the storage is used as an expansion amount. The expansion ratio is defined as follows.

Expansion ratio (%)=(expansion amount/thickness of a battery before storage)×100

The following method of measuring the thickness of a battery is used. Specifically, the battery is placed on a stand having a horizontal plane. A disc which is parallel to the plane and is larger than the surface portion of a battery is lowered to the battery. The thickness of the battery was measured in a state where a load of 300 g was applied to the disc. When the surface portion of the battery is not a flat face, the highest part of the surface portion of the battery is used to measure thickness.

In FIG. 6, L=62 mm, W=35 mm, and D=3.8 mm. The device area is 56 mm×34 mm=1904 $mm^2$. When the surface portion of a battery is a flat face, pressure to be applied on the battery is 0.16 $gf/mm^2$.

The result of measurement of the expansion ratio after storage is as shown in Table 5. When the expansion ratio is 4% or lower, there is no problem in practice. It is therefore desirable that the expansion ratio is 4% or lower.

TABLE 5

| Expansion ratio of battery | | | | | |
|---|---|---|---|---|---|
| | | $Li_2CO_3$(percent by weight) | | | |
| | | 1 | 0.15 | 0.07 | 0.01 |
| moisture (ppm) | 400 | 9.00% | 6.80% | 6.00% | 4.70% |
| | 300 | 7.50% | 4.00% | 3.60% | 3.00% |
| | 200 | 6.40% | 3.50% | 2.80% | 2.40% |
| | 100 | 5.10% | 2.80% | 2.30% | 2.00% |

4% of the expansion ratio is applied to the range where the content of lithium carbonate is 0.15 percent by weight, and the content of moisture is 300 ppm and less.

As described above, by controlling the contents of lithium carbonate and moisture in the positive electrode active material, the expansion ratio of the battery can be suppressed to 4% or lower. The reason that the expansion ratio decreases is considered as follows. In the case where lithium carbonate is contained in the positive electrode active material, the lithium carbonate is decomposed by heat when the battery is stored at high temperature and carbon dioxide is resulted. When moisture exists in the positive electrode active material, reaction occurs between the moisture and an electrolyte such as $LiPF_6$ to generate HF. By the action of HF, the decomposition of lithium carbonate is promoted, and carbon dioxide is generated. The generation of carbon dioxide is considered as a cause of the expansion of a battery. In the embodiment, the contents of lithium carbonate and moisture as a cause of generation of carbon dioxide are reduced. Consequently, it is presumed that occurrence of carbon dioxide is suppressed, and the expansion of a battery is accordingly suppressed.

In consideration of the above, according to the third embodiment of the invention, the positive electrode active material is a composite oxide of Li and a transient metal, and carbonate contained in the positive electrode active material is equal to or lower than 0.15 percent by weight. Consequently, decomposition reaction when the battery is stored at high temperature is suppressed. Thus, expansion of the battery when the battery is stored at high temperature can be suppressed.

Although not specifically described here, similar effects are also produced also in the case where other laminated films having structures other than the structure in which a nylon film, aluminum foil, and a polyethylene film are sequentially laminated are used. Similar results can be obtained also in the case where a metal film or a polymer film is used in place of the laminated film.

Although the invention has been described by the foregoing embodiments and examples, the present invention is not limited to the embodiments and the examples but can be variously modified. For example, although the secondary batteries each using a gel electrolyte containing lithium salt, a non-aqueous solvent, and a polymer material has been described in the embodiments and examples, in place of the gel electrolyte, other electrolytes such as a liquid electrolyte obtained by dissolving a lithium salt into a solvent, a solid electrolyte obtained by dispersing lithium salt into polyethylene glycol or a polymer compound having ion conductivity such as acrylic polymer compound may be used.

In the foregoing embodiments and examples, the two films 30*a* and 30*b* are used as the packaging member 30 and the battery device 20 is sealed in the two films 30*a* and 30*b*. It is also possible to fold a single film, closely adhere the peripheries of the film, and seal the battery device 20 in the folded film.

Further, the secondary batteries have been described as specific examples in the foregoing embodiments and examples. The present invention can be also applied to batteries of other shapes as long as a film-state packaging member is used. In addition, although the non-aqueous secondary batteries have been described in the foregoing embodiments and examples, the present invention can be also applied to other batteries such as primary battery.

As described above, in the battery of the invention, the concentration in mass ratio of a free acid in a non-aqueous electrolyte is suppressed to 60 ppm. Consequently, generation of a gaseous hydride in a battery and generation of a gas due to corrosion reaction in the battery can be suppressed. Thus, even when a film-state packaging member is used, effects such that a change in shape due to expansion can be prevented and the shape can be maintained even when the battery is stored in a high-temperature environment.

It is also possible to suppress consumption of an electrode reactant due to reaction between the free acid and an electrode reactant in a battery system. An effect such that deterioration in battery characteristics can be prevented is also produced.

The second aspect of the invention produces effects such that, since the positive electrode active material is a complex oxide of Li and transition metal, and the average particle diameter of the positive electrode active material lies in the range from 10 to 22 $\mu$m, the expansion of the battery when the battery is stored at high temperature can be suppressed. The discharge capacity sustain ratio can be also improved.

The third aspect of the invention produces effects such that, since the positive electrode active material is a complex oxide of Li and transition metal, and carbonate compound contained in the positive electrode active material is 0.15 percent by weight. Thus, expansion of a non-aqueous electrolyte battery which occurs when the battery is stored at high temperature can be suppressed.

Obviously many modifications and variations of the present invention are possible in the light of the above teachings. It is therefore to be understood that within the scope of the appended claims the invention may be practiced other wise than as specifically described.

What is claimed is:

1. A non-aqueous electrolyte secondary battery comprising:

a battery device having a positive electrode having a collector, on which a positive electrode active material layer containing a positive electrode material is formed, a negative electrode, and a non-aqueous electrolyte layer, the battery device being sealed in a film-state packaging member, wherein concentration in mass ratio of a free acid in the electrolyte layer is 60 ppm and less;

wherein a metal foil laminate case or a laminated film obtained by coating metal foil with a resin and having a structure of packaging resin layer/metal film/sealant layer is used.

2. A non-aqueous electrolyte secondary battery according to claim 1, wherein the positive electrode active material is a composite oxide $LiMO_2$ (where, M is at least one material selected from Co, Ni, and Mn) made of a lithium and a transition metal.

3. A non-aqueous electrolyte secondary battery according to claim 2, wherein the composite oxide of a lithium and a transition metal is at least one material selected from $LiCoO_2$, $LixCo_{1-y}AlyO_2$ (where $0.05 \leqq x \leqq 1.10$ and $0.01 \leqq y \leqq 0.10$), $LiNiO_2$, $LiNiyCo_{1-y}O_2$ (where $0<y<1$), $LxNiyM1\text{-}yO_2$ (where M denotes at least one of transition metals, B, Al, Ga, and In, $0.05 \leqq x \leqq 1.10$ and $0.7 \leqq y \leqq 1.0$), and $LiMn_2O_4$.

4. A non-aqueous electrolyte secondary battery according to claim 3, wherein the positive electrode active material is $LiCoO_2$.

5. A non-aqueous electrolyte secondary battery according to claim 1, wherein the electrolyte is made of a lithium salt and a polymer compound, in which the lithium salt is dissolved or mixed, and one or more polymer compounds selected from one or more polymer compounds selected from the group consisting of ether-based polymers which is poly(ethylene oxide) and a crosslinked of the poly(ethylene oxide), poly(methacrylate) ester polymer, acrylate polymer, and fluorine polymer which is poly(vinylidene fluoride) and poly(vinylidene fluoride-co-hexafluoropropylene).

6. A non-aqueous electrolyte secondary battery according to claim 1, wherein the electrolyte layer is made of a lithium salt, a non-aqueous solution, and a polymer material, and at least one of $LiPF_6$, $LiBF_4$, $LiAsF_6$, $LiClO_4$, $LiCF_3SO_3$, $Li(CF_3SO_2)_2N$, $LiC_4F_9SO_3$, LiCl, and LiBr is mixed as a lithium salt.

* * * * *